April 15, 1941. E. H. EDWARDS 2,238,164
METHOD AND MACHINE FOR MANUFACTURING MARSHMALLOWS,
OTHER CONFECTIONS, AND FOOD PRODUCTS
Filed Feb. 12, 1940 8 Sheets-Sheet 2
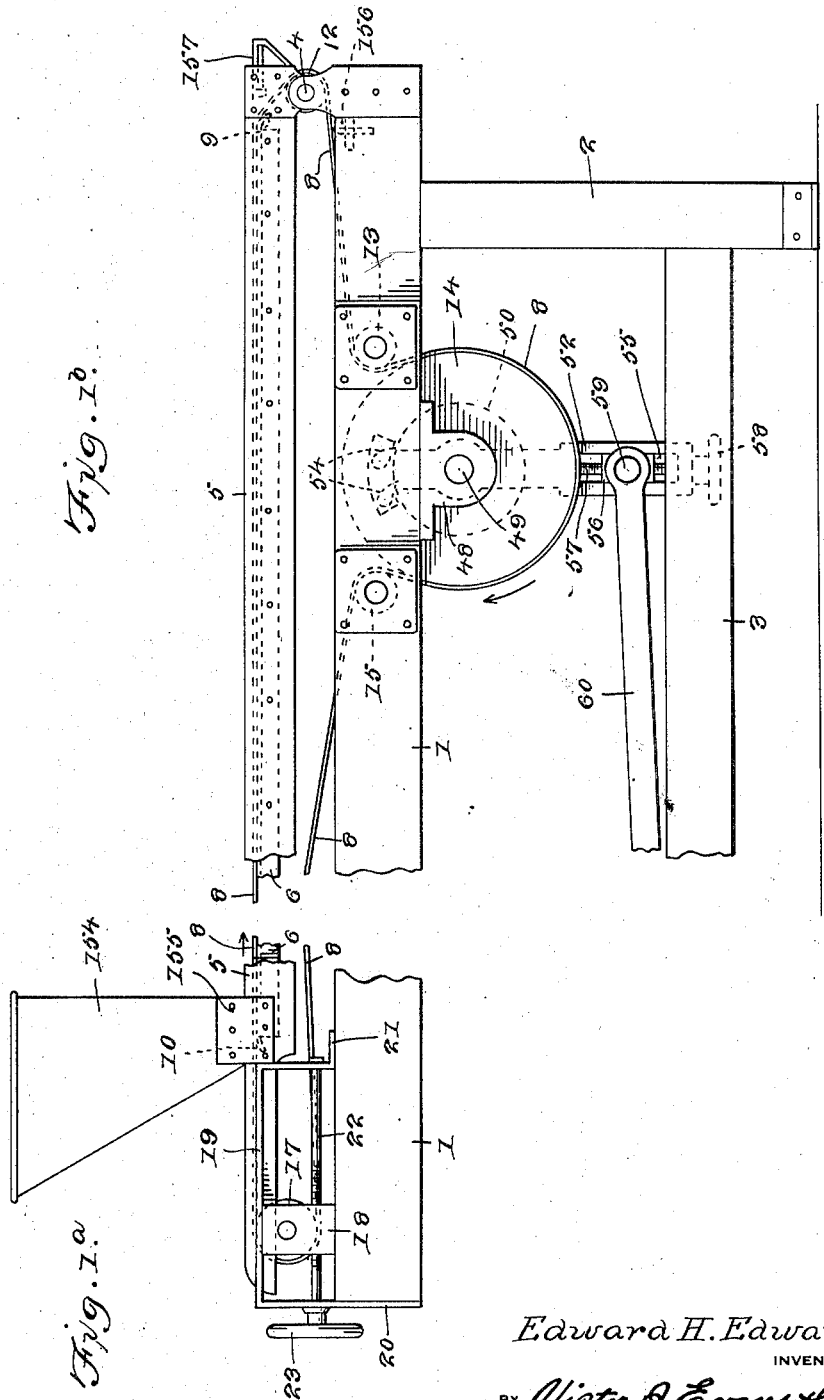
Edward H. Edwards
INVENTOR
BY Victor J. Evans & Co.
ATTORNEYS April 15, 1941.　　　　E. H. EDWARDS　　　　2,238,164
METHOD AND MACHINE FOR MANUFACTURING MARSHMALLOWS,
OTHER CONFECTIONS, AND FOOD PRODUCTS
Filed Feb. 12, 1940　　　8 Sheets-Sheet 3
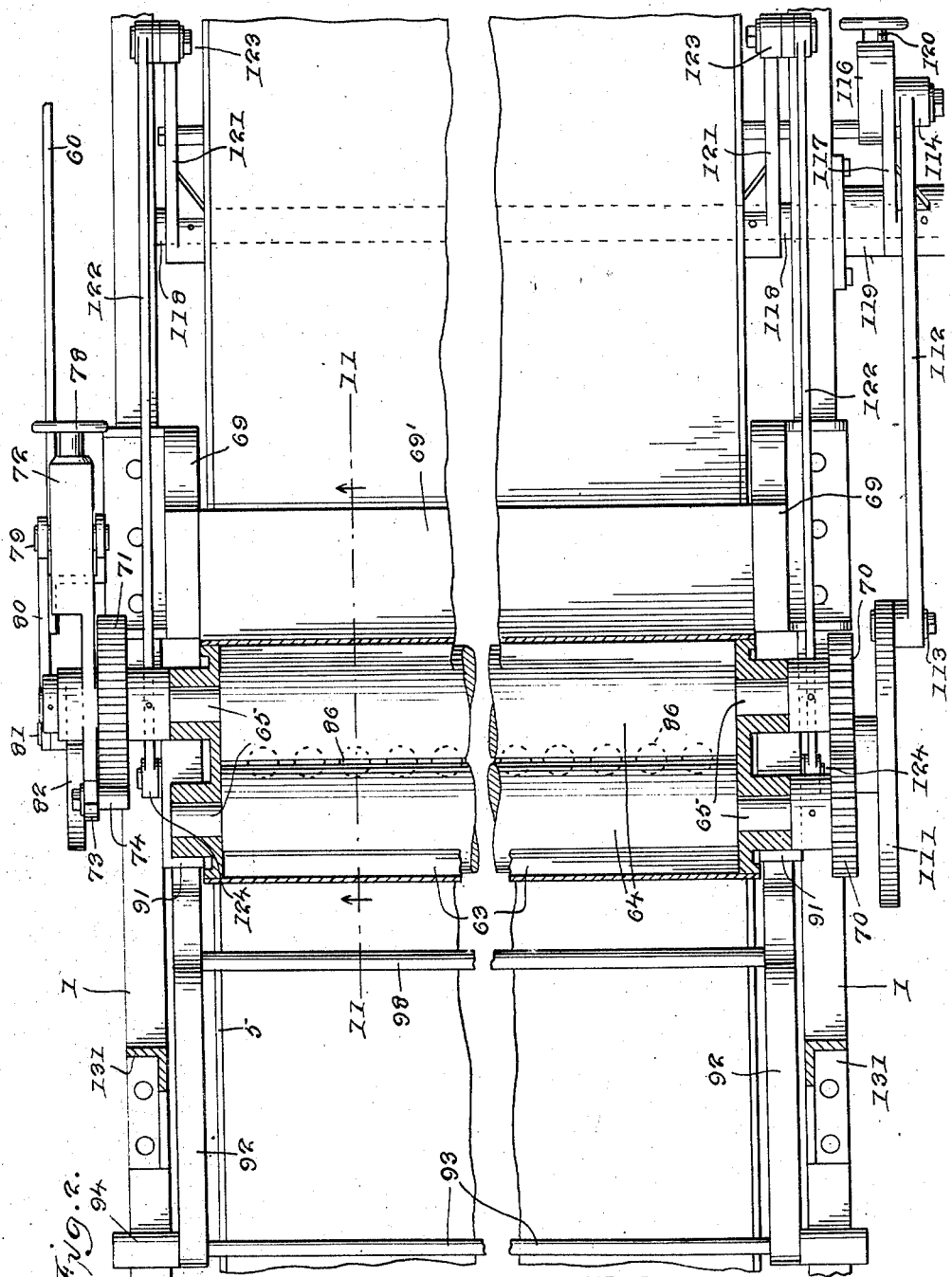
Edward H. Edwards, INVENTOR
BY Victor J. Evans & Co.
ATTORNEYS

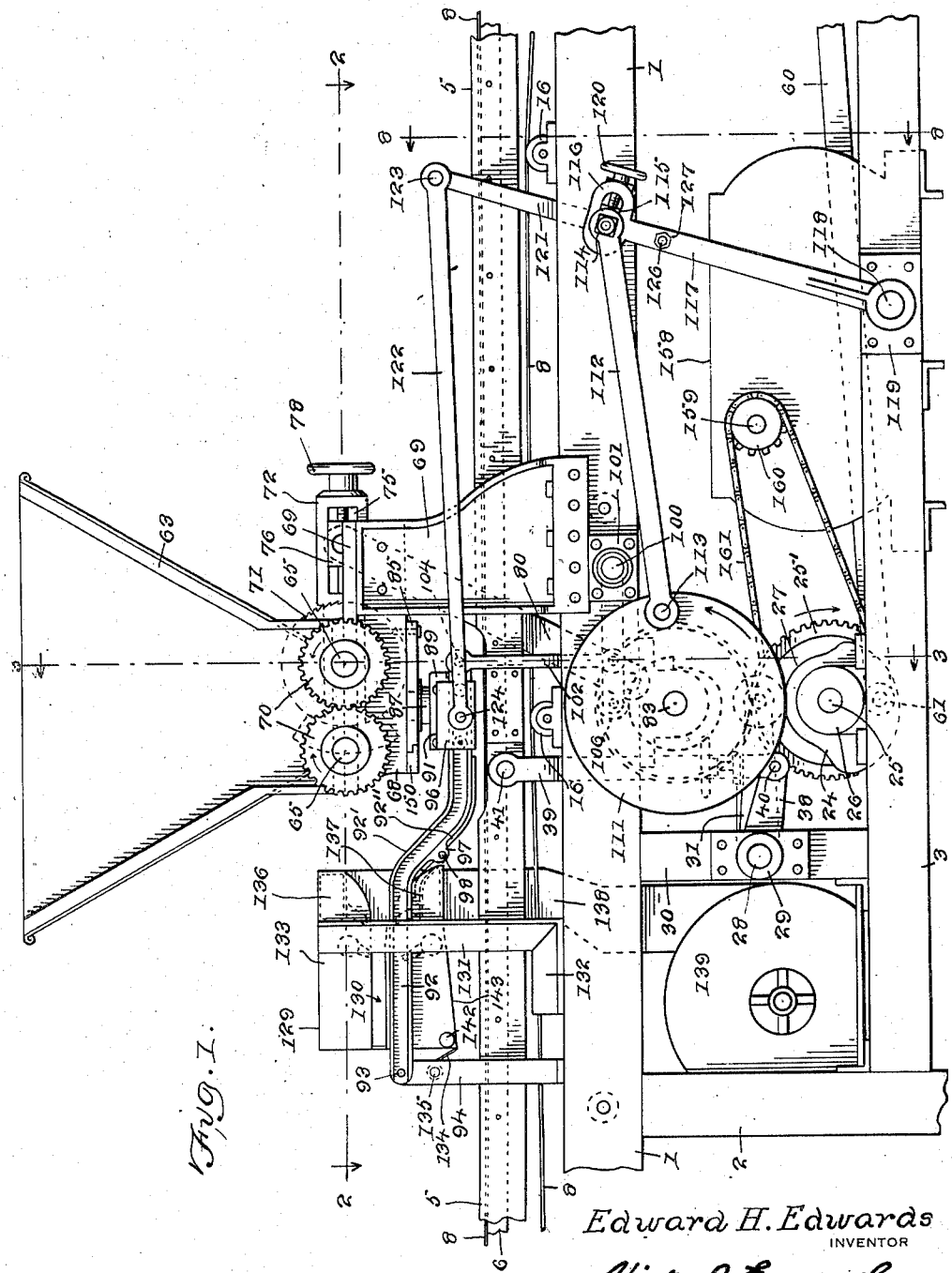

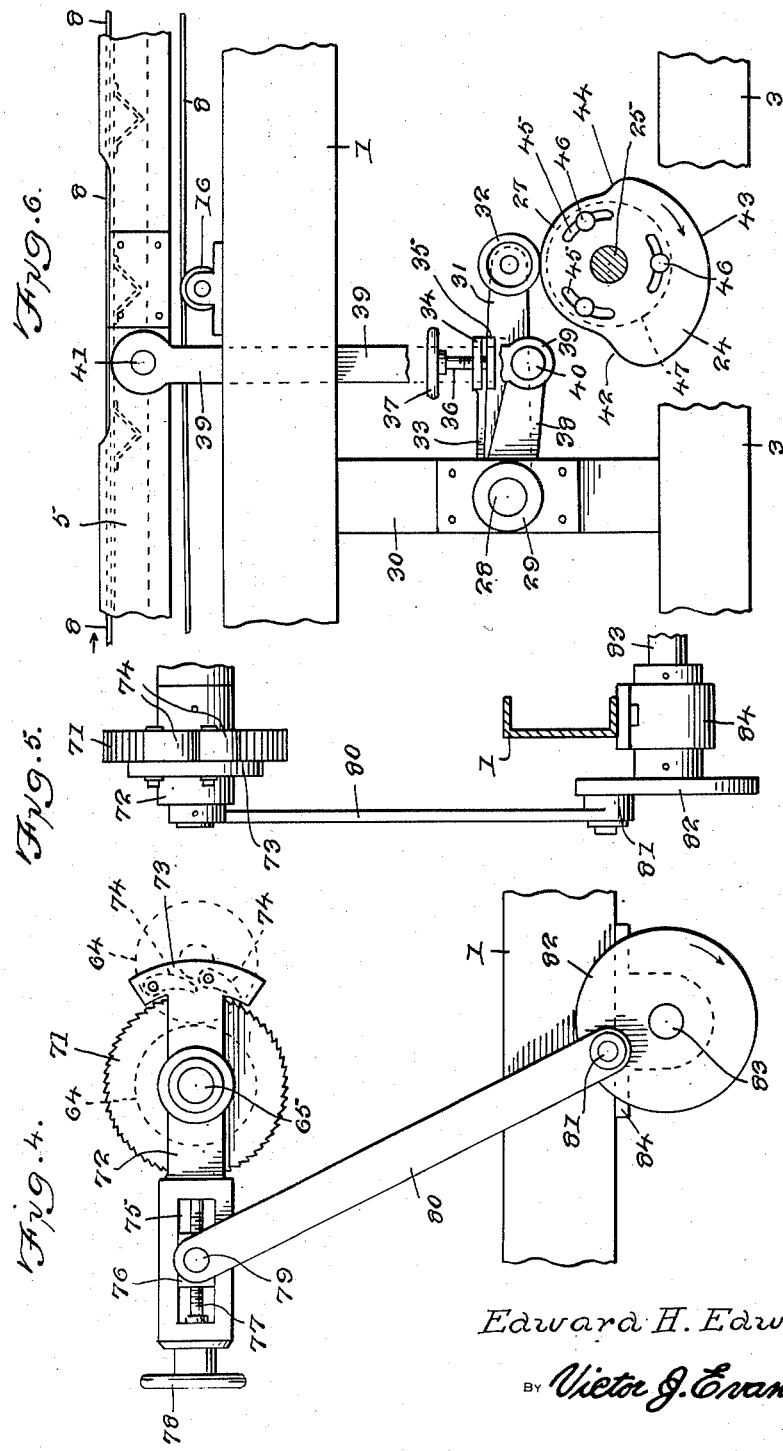

April 15, 1941.  E. H. EDWARDS  2,238,164
METHOD AND MACHINE FOR MANUFACTURING MARSHMALLOWS,
OTHER CONFECTIONS, AND FOOD PRODUCTS
Filed Feb. 12, 1940    8 Sheets-Sheet 6
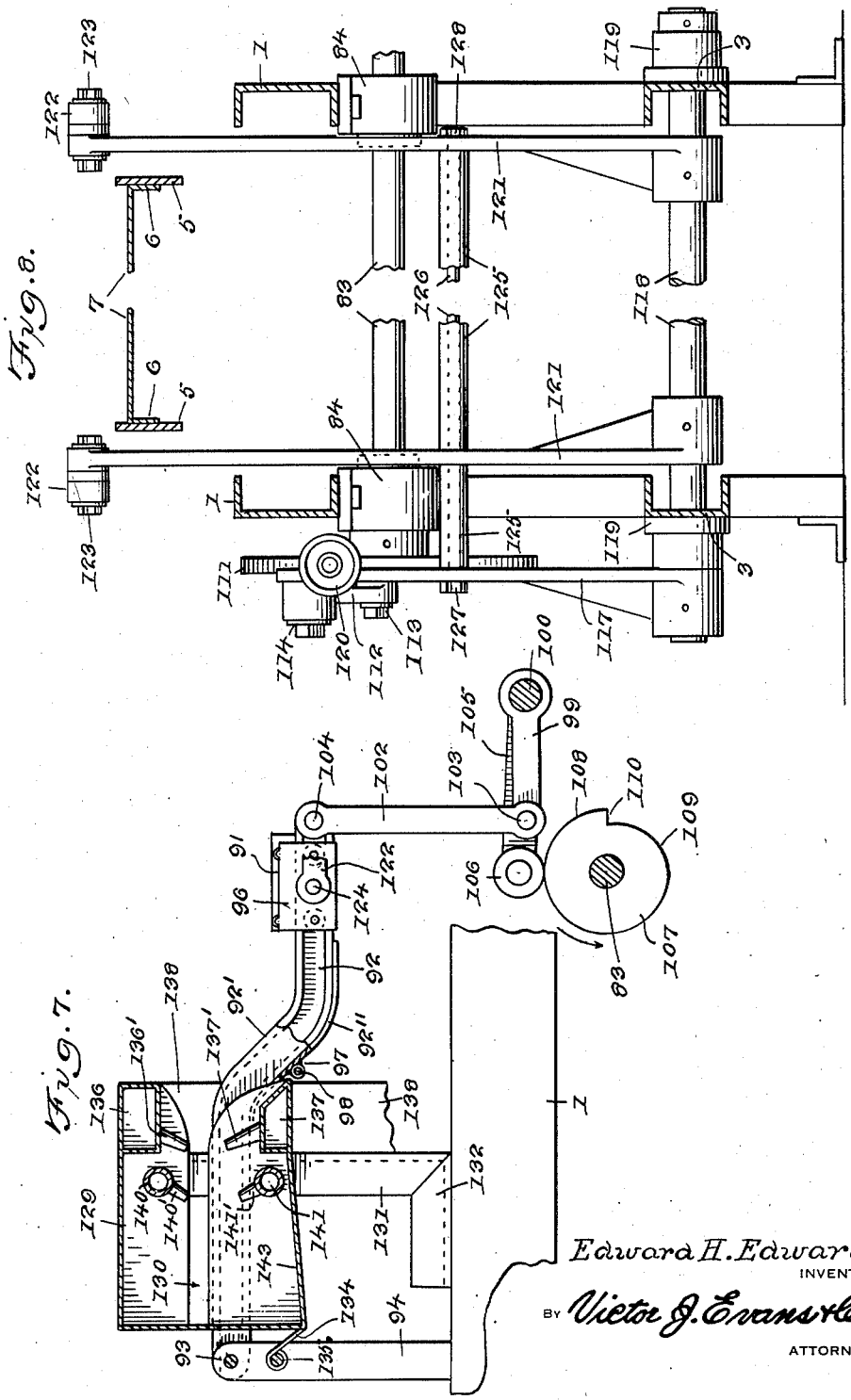
Edward H. Edwards
INVENTOR
BY Victor J. Evans & Co.
ATTORNEYS

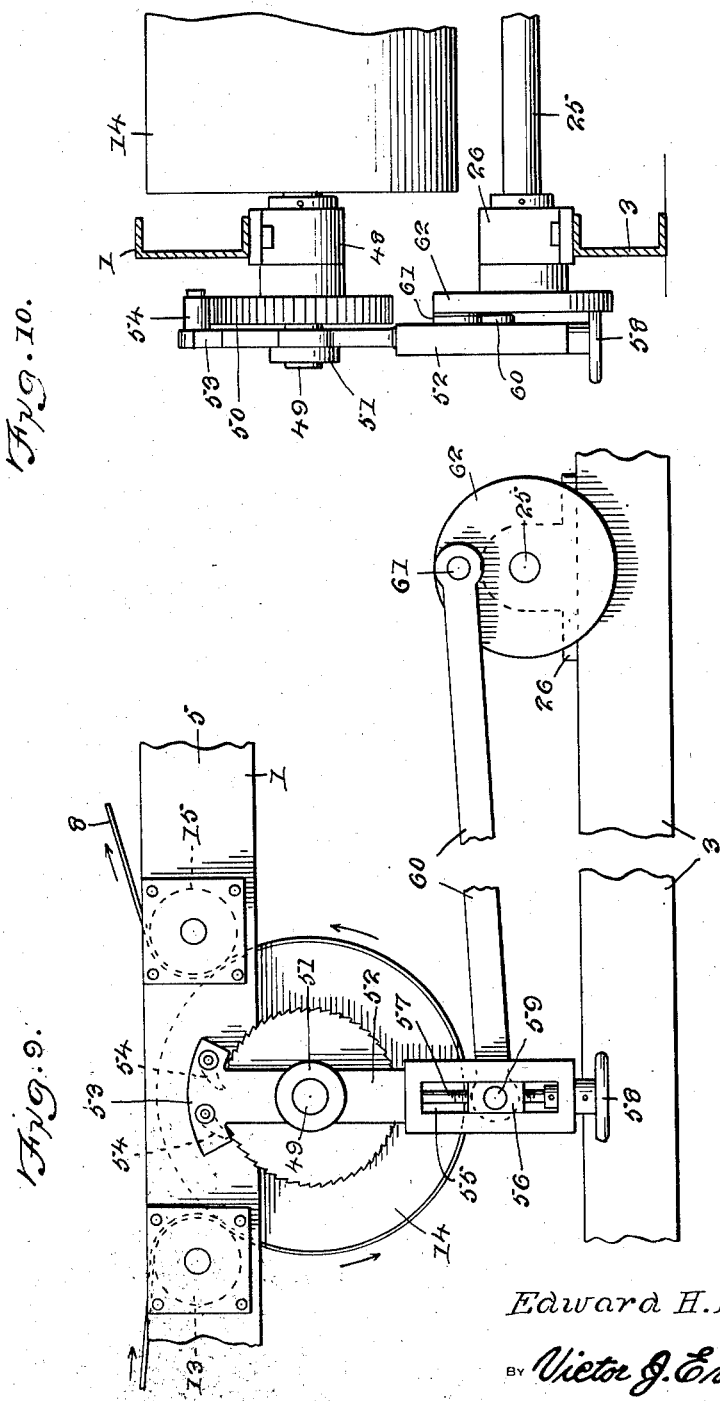

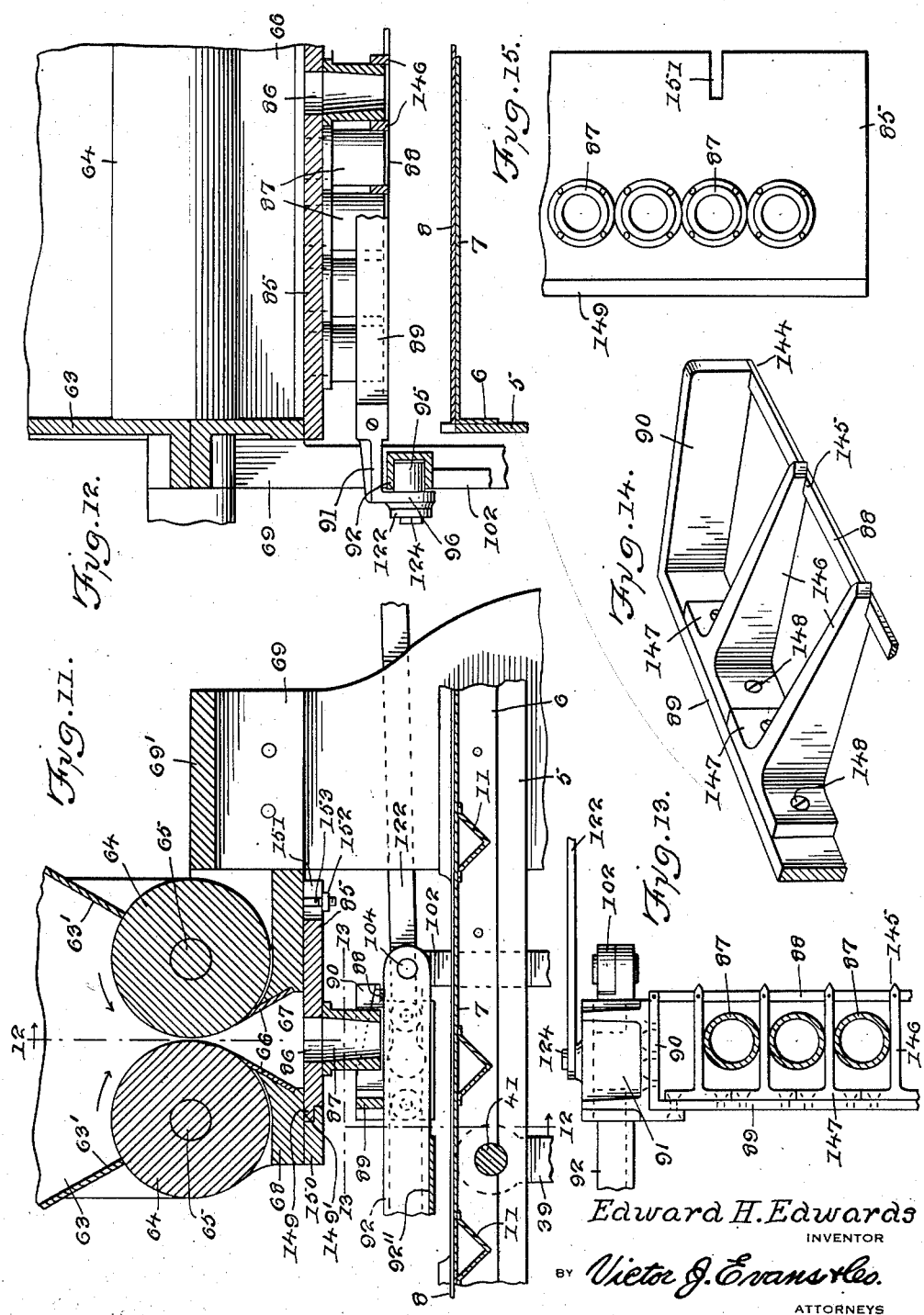

Patented Apr. 15, 1941

2,238,164

UNITED STATES PATENT OFFICE

2,238,164

METHOD AND MACHINE FOR MANUFACTURING MARSHMALLOWS, OTHER CONFECTIONS, AND FOOD PRODUCTS

Edward H. Edwards, Chicago, Ill.

Application February 12, 1940, Serial No. 318,621

8 Claims. (Cl. 107—54)

This invention relates to a machine and method for manufacturing confections and food products such as marshmallows, various candies, cakes, cookies and the like by a special and novel dropping and cutting process instead of casting or molding the pieces or centers or cores in the previously common and ordinary way in starch, powdered sugar or other characteristic material of a certain consistency and packed and impressed to produce a mold that will hold and maintain a particular form or impression.

The usual procedure heretofore followed in making what is commonly termed marshmallows, certain kinds of candy, cream centers for chocolate dipped and other coated confections, and also jellied candies and gum work, such for example, as orange slices, gum drops, jelly beans and the like, and even caramels, nougats, etc., is to first fill shallow trays with a body of starch or other suitable material approximately an inch and one-half in depth, in which patterns or molds are pressed, or by forming the molds upon a board, and in these molds are deposited the material constituting the particular products while the material is warm and in a flowable condition, the material being thus molded according to the shape of the various cavities in the body of starch or other material. The trays are then taken to a cooling or drying room or chamber where the exterior of the molded material hardens or forms a crust sufficient to permit the molded pieces to be separated from the mold body material and hold their respective shapes or forms.

There are many disadvantages and objections to the foregoing method, principally among which is the required number of separate trays or mold boards and the labor in placing the trays on the machine and the removal of the trays therefrom, as well as conveying the trays with the molded pieces thereon to the air-conditioned cooling or dehumidifying rooms or chambers. There is a further objection to the foregoing method due to the storage space requirements in stacking the trays before and after use and a still further serious objection in that the starch or other material comprising the molds draws the moisture out of the product and also because the starch being constantly used becomes dirty and accumulates bacteria as well as small particles of previous day runs and is thus unsanitary.

The object of the present invention is to overcome the above noted disadvantages and objections; to minimize floor space in machine installation with a maximum output of products; and to produce a simple yet practical and efficient machine which is not only economically manufactured but is likewise maintained in operation and on which various kinds of confections and food products may be produced by substantially one and the same method.

With the foregoing and other objects and advantages to be attained, as will hereinafter more fully appear, the invention consists in the novel general structure and in the parts and combinations and arrangements of parts thereof as hereinafter described and afterwards set forth with particularity in the appended claims, reference being had to the accompanying drawings illustrating a practical adaptation of the invention, in which—

Figure 1 is a side elevation of the middle portion of the machine and including the more essential parts of the present invention;

Figure 1ᵃ is a fragmentary view in side elevation of the end portion of the machine to the left of the middle portion shown in Figure 1;

Figure 1ᵇ is a similar view of the portion of the machine to the right of the portion shown in Figure 1;

Figure 2 is a view, on an enlarged scale, partly in top plan and partly in horizontal section on the line 2—2 of Figure 1;

Figure 4 is a fragmentary view, in side elevation, illustrating the ratchet driving means for the feeding rolls of the material supply hopper of the machine;

Figure 5 is an edge elevational view of the parts shown in Figure 4;

Figure 6 is a fragmentary view, in side elevation, illustrating parts of the mechanism for raising and lowering the table frame and bed plate carrying the upper flight of the endless belt conveyor of the machine;

Figure 7 is a fragmentary view, partly in side elevation and partly in vertical section, illustrating details of the lifting and lowering means for the trackway of the knife carriage and the cleansing and drying means for the knife blade;

Figure 8 is a fragmentary view, in vertical section, taken on or about the line 8—8 of Figure 1;

Figure 9 is a fragmentary view, in side elevation, illustrating details of the driving mechanism for the endless conveyor;

Figure 10 is a view in cross section of the machine frame and showing associated parts of the conveyor driving mechanism in edge elevation;

Figure 11 is a fragmentary view, on an enlarged scale, in longitudinal section taken on or about the line 11—11 of Figure 2;

Figure 12 is a fragmentary sectional view taken on or about the line 12—12 of Figure 11;

Figure 13 is a fragmentary view in horizontal section, taken on or about the line 13—13 of Figure 11;

Figure 14 is a perspective view of a portion of the knife carriage frame; and

Figure 15 is a fragmentary inverted plan view of a portion of the die nozzle unit detached.

Figure 3:
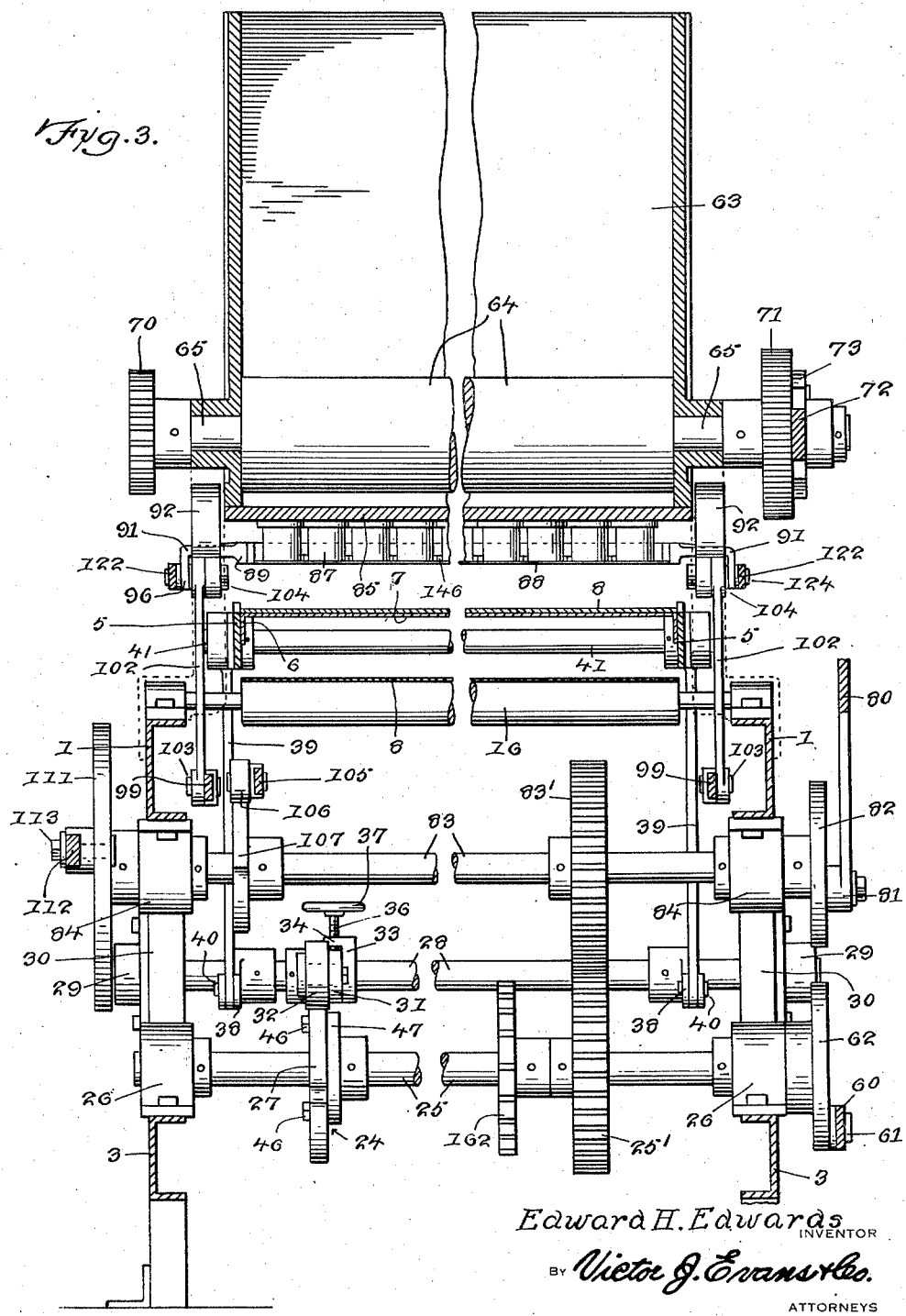
Figure 3 is a view on the same scale as Figure 2 but in vertical section taken on or about the line 3—3 of Figure 1.

The process for making confections and food products in accordance with the present invention, generally stated, consists in forcing a predetermined measured quantity of the material through a vertical die nozzle or a plurality thereof onto a table which is, in effect, an intermittently movable conveyor, said table being raised and lowered during a period of rest in its intermittent travel, the raising of the table to a plane a short distance below the die nozzle or nozzles, approximately one-quarter inch therefrom, occurring just prior to the discharge of the material from the latter and the table being lowered simultaneously with the discharge of the material which follows supportedly thereon. Then, after the proper quantity of material is exuded from the die nozzle or nozzles, the table continues to move downwardly, away from the exuded material, leaving it hung from the die nozzle or nozzles, and as soon as the table reaches a plane approximately one-half inch below the exuded material a knife element is moved across the lower end of the die nozzle or nozzles, thereby severing the exuded material from that remaining within the die nozzle or nozzles, and immediately after such operation the knife element is given a quick downward movement with an abrupt stoppage, thereby causing a shock which jars the severed body of material from the knife element and deposits it on the table which has been previously lowered therefrom as just above stated, it being, of course, understood that the table in use is previously dusted with powdered sugar or some suitable soft and loose starchy material to prevent adhesion of the deposited pieces. The detailed steps in the process will be later more specifically described after a description of the illustrated machine on which the process is carried out.

Referring now to the accompanying drawings in detail, the numeral 1 designates, generally, the upper portion of the main body frame of the machine, which, as shown, comprises longitudinal side members which extend from end to end of the machine and are of channel section with their flanges disposed inwardly. This upper frame portion 1 may be obviously cross-braced at its opposite ends and at intervals throughout its length in any approved manner, not shown, and supported on a conventional underframe including a plurality of vertical members 2 located at suitable places within the length thereof, said vertical members being connected by longitudinal lower side members 3 preferably of channel section and with their flanges disposed inwardly like the flanges of the upper side frame members 1, the underframe being obviously cross-braced in any approved manner, not shown.

Hingedly mounted, as at 4, at one end of the upper frame structure 1, hereinafter sometimes referred to as the discharge end of the machine, is a table frame 5 comprising flat longitudinal side members which are riveted, bolted or otherwise secured to downturned marginal flanges 6 of a bed plate 7, which, as thus interposed between and fastened to the side members 5, not only affords a support for the upper flight of an endless belt conveyor 8, to be presently more fully described, but serves as a stiffening reinforcement for said side members 5.

The bed plate 7, as shown, terminates short of the hinged discharged end of the table frame and is turned downwardly and rounded, as at 9, while its opposite end terminates a greater distance short of the free end of the table frame, as at 10, and is turned downwardly and rounded like the end portion 9 thereof. The bed plate 7 is preferably reinforced by transverse sheet metal members 11 of angular cross-sectional form welded or otherwise fastened on the underside thereof as more clearly shown in Figure 11.

The table frame 5 is of a given width between the longitudinal side members thereof, determined according to the desired output capacity of the machine, and the endless belt 8, the upper flight of which rides upon the bed plate 7, is of a width slightly less than the distance between said longitudinal side members of the frame. The belt travels on the bed plate 7 toward the discharge end of the machine where it is carried over the downturned and rounded end portion 9 of the bed plate, obliquely therefrom and thence over a roller 12 the axis of which is coincident with the axis of the hinge 4 between the adjacent end portion of the table frame 5 and upper body frame portion 1 of the machine. From the roller 12 the endless belt 8 is carried over a supporting roller 13, thence downwardly from the roller 13 and around a driving roller 14 of much larger diameter than the roller 13, and from the roller 14 to and over a supporting roller 15, whence it is carried over a plurality of supporting rollers 16 journaled on top of the longitudinal side members of the upper body frame portion 1, said rollers 16 supporting the lower flight of the belt in close proximity to the underside of the table frame 5 throughout the distance between the rollers. In this connection it is noted that the several rollers 12, 13, 14, 15 and 16 extend the full width of the belt 8 and it is further pointed out that the rollers 13 and 15 which are located close to the periphery of the large driving roller 14 are journaled on the upper body frame portion 1 with their axes in a plane some distance below the plane of the axes of the rollers 16 and also below the plane of the axis of the roller 12, whereby the belt travels at a downward inclination from the roller 12 to the roller 13 and at an upward inclination from the roller 15 to the first roller 16 of the horizontal series.

From the last roller 16 the lower flight of the belt 8 travels at a downward inclination to an end supporting roller 17 of somewhat larger diameter and thence up over said roller 17 the axis of which is in a plane so that its uppermost peripheral portion suports the top flight of the belt normally in the plane of the top face of the bed plate 7, the upper flight of the belt being free of support between said roller 17 and the downturned and rounded end portion 10 of the bed plate for a particular purpose to be later described.

The roller 17, as shown, is journaled at its opposite ends in bearing blocks 18 which are adjustable longitudinally on the adjacent end portions of the longitudinal side members of the upper body frame portion 1, said blocks 18 riding between the top flanges of said longitudinal frame members and the upper portions of rectangular frames 19 which are secured at one end to the ends of the respective frame members, as at 20, and at their opposite ends to the top flanges of said frame members, as at 21, the adjustment of the bearing blocks 18 being effected by manipulation of adjusting screws 22 swiveled at their opposite ends in the adjacent end portions of the frames 19, said screws extending through screw-threaded bores in the blocks and having hand wheels 23 secured on their outer ends by which they are rotated in either direction to move the bearing blocks 18 inwardly or outwardly on the supporting frame to tighten or loosen the belt as may be necessary. In the operation of the machine the end roller 17 is adjusted so that there is but little slack in the belt 8 whereby there is sufficient traction between the periphery of the driving roller 14 and that part of the belt looped thereabout for effecting a positive drive of the belt, yet permitting ample flexing of that portion of the belt between the end roller 17 and adjacent end portion 10 of the bed plate 7 of the table frame 5 to permit limited upward swing of said table frame 5 from the axis of its hinge 4 in a certain operation of the machine as will be later more fully described.

The hingedly mounted table frame 5 is supported from a cam element 24 which is mounted on the main driving shaft 25 of the machine, said shaft being journaled at its opposite ends in bearings 26 provided therefor on the lower longitudinal body frame members 3 and rotated constantly during the operation of the machine as will be later more fully described. The cam element 24 is formed with a concentric low peripheral portion 27, which, during a part of the rotation of the cam, supports the table frame 5 in its normal lowermost position, in which said table frame is shown throughout the several views thereof in the drawings. The mechanism for supporting and operating the table frame 5 in conjunction with the cam element 24 comprises an adjustable supporting and actuating lever mounted on a horizontal rock shaft 28 which is journaled at its opposite ends in bearings 29 mounted on vertical body frame members 30 extending between the upper longitudinal members 1 and lower longitudinal members 3 of the frame. This supporting and actuating lever comprises an arm 31 which is freely rotatable at one end on said rock shaft 28 and carries at its opposite end a bearing roller 32 which rides on the cam element 24. Fixed on the rock shaft 28 to rotate therewith is a companion arm 33 having a lateral ear 34 at its outer end which overhangs a corresponding ear 35 provided on the arm 31 intermediate the ends thereof. The ear 34 of the arm 33 is provided with a screw-threaded aperture in which is fitted an adjusting screw 36 the lower end of which bears against the underlying ear 35 of the arm 31, said adjusting screw being provided with a hand wheel 37 or other suitable manipulating means at its upper end whereby it is readily operated to set the two arms 31 and 33 in varied angular relation to each other.

A pair of like lever arms 38 are fixed one each on the rock shaft 28 near the ends of the shaft and just inwardly from the vertical frame members 30, said arms 38 having the lower ends of vertical link members 39 pivotally attached thereto, as at 40, the upper ends of said link members being pivotally attached to the respective longitudinal side members of the table frame 5, as at 41. By this lever and link provision and the bearing roller 32 of the lever arm 31 resting on the concentric low portion 27 of the cam element 24, the adjusting screw 36 is readily manipulated to set the lever arms 31 and 33 in the proper angular relation to each other for the positioning of the table frame 5 at the desired normal elevation above the upper longitudinal members 1 of the body frame of the machine and in working relation to the die nozzle or nozzles to be later described. In this connection it is here noted that during the part of the rotation of the cam element 24 with the bearing roller 32 of the arm 31 riding on its concentric low portion 27 as just above described, the table frame 5 is maintained in its normal lowered position throughout a definite time in the operation of the machine, but the cam element is provided with a relatively abrupt rise of its peripheral portion, as at 42, which lifts the table frame 5 quickly to a definite position above normal, from which abrupt rise of the cam the peripheral portion recedes gradually with eccentric curvature, as at 43, to a point where there is a relatively abrupt drop of the peripheral portion, as at 44, back to the aforesaid concentric low portion 27, by which formation of the cam the table frame 5 is gradually lowered away from its uppermost position during the discharge from the die nozzle or nozzles of a predetermined measured quantity of the constituent material of the product made on the machine and then with a sudden drop away from the exuded material as hereinbefore generally described and to be later more specifically stated.

It is here also pointed out that the cam element 24 is preferably adjustable on the drive shaft 25 for varying the time of operation of the cam element with relation to the other parts of the mechanism of the machine as will later more fully appear. For this purpose the cam element 24 is mounted rotatably on the driving shaft 25 and is provided with an annular series of arcuate slots 45 through which securing bolts or equivalent elements 46 are inserted into screw-threaded or other apertures provided therefor in a supporting disk 47 which is pinned or otherwise fixedly secured on the driving shaft 25 so as to rotate therewith. The cam is thus adjustable rotatively of the shaft 25 for advancing or retarding its functional effect relative to the coordinated other parts of the machine.

An intermittent travel is imparted to the endless belt 8 by the provision of a ratchet driving mechanism for the belt-driving roller 14, said roller being journaled at its opposite ends in bearings 48 mounted on the undersides of the upper longitudinal body frame members 1, the spindle 49 at one end of the roller extending outside the adjacent bearing 48 and having a peripherally toothed ratchet wheel 50 pinned or otherwise secured thereon so as to rotate therewith. Mounted freely rotatable on the spindle 49 and held in place by an outer collar member 51 fixedly secured on the spindle is an oscillatory element 52 having an arcuate head 53 at its upper end carrying a pair of conventional pawls 54 which are respectively arranged so that at least one of them is always engageable with a tooth of the ratchet wheel 50 in whatever position to which the wheel may be turned. The lower end portion of the oscillatory element 52 is provided with an elongated longitudinal slot 55 in which is slidably fitted a block 56 which works on an adjusting screw 57 extending through a screw-threaded bore in the block and lengthwise of the slot with a swiveled mounting in the element 52 and having a hand wheel 58 at its lower end for manipulation thereof.

The adjustable block 56 on the oscillatory element 52 is provided with a lateral stud 59 to which one end portion of a pitman bar 60 is pivotally attached, the opposite end of said bar being pivotally attached, as at 61, to a crank disk 62 which is fixed on the driving shaft 25 just outside the adjacent shaft bearing 26, by which connection between the crank disk 62 and said element 52 the latter is oscillated on the spindle 49 of the belt-driving roller 14 when the crank disk is rotated, the oscillation of the element 52 through the intermediary of the pawls 54 on said element 52 which engage the ratchet wheel 50, giving to the roller 14 an intermittent partial rotation, thereby causing a corresponding step-by-step travel of the endless belt 8, the actuating stroke of the oscillatory member 52 being timed with relation to the aforesaid lifting and lowering operations of the table frame 5 so that the endless belt is at rest during the time the material comprising the product made on the machine is being formed and deposited on the belt as will be presently more fully described.

The provision for feeding the material and forming it to constitute the product made on the machine will now be described. As shown, a conventional hopper 63 is located some distance above the table frame 5 at or about the middle of the machine and vertically above the main driving shaft 25 (see Figure 1). The upper body portion of the hopper may be of any desirable structure but the lower portion thereof is specially constructed and arranged with material feeding means in accordance with the present invention, certain details of which are illustrated more clearly in Figure 11 of the drawings. The bottom opening of the hopper is covered by a pair of feeder rollers 64 which are disposed in parallel relation to each other with the axes of their shafts 65 in the same horizontal plane and the rollers being spaced apart with a gap of slight width therebetween and extending throughout the length thereof between the adjacent end walls of the hopper, the dimensions of the space between the diametrically opposed peripheral portions of the rollers 64 being predetermined for the passage of a given quantity of material therethrough, and, in practice, although not shown in the drawings, the rollers 64 may be obviously mounted with provision for adjustment toward and from each other to vary the dimension of the gap therebetween for the feeding of predetermined quantities of materials of different consistencies. However, in most cases, such adjustment is unnecessary as the quantity of material passed between the rollers may be varied by accordingly varying the degree of peripheral travel of the rollers, the operation of the rollers, in accordance with the present invention, being intermittent and in timed relation to the mechanism of the product forming and conveying means of the machine.

As shown, the feeder rollers 64 are peripherally close to the lower edges of the opposed inclined walls 63' of the hopper and they are also peripherally close to the upper edge portions of opposed plates 66 which are downwardly divergent and provide opposed walls of a transversely flared elongated throat which extends parallel with the rollers 64 from end wall to end wall of the hopper. The outlet opening or mouth 67 of the hopper in which the downwardly divergent throat walls 66 terminate is formed as a rectangular opening in a shelf extension 68 of upright supporting brackets or standards 69 which are respectively mounted on the longitudinal side members 1 of the upper body frame structure of the machine and connected at their upper ends by a rigid top cross body member 69'.

With the two feeder rollers 64 rotating simultaneously but in opposite directions and with downward travel of their meeting peripheral portions, the material in the hopper 63 is fed through the restricted space between the rollers into the flared throat of the outlet below and this actuation of the rollers in the operation of the machine is effected intermittently as just above described, the extended shafts 65 of said rollers at one side of the hopper having intermeshing spur gears 70 of the same size fixed thereon to rotate therewith, and the extended opposite end portion of the shaft of one of the rollers has a ratchet wheel 71 fixed thereon, said ratchet wheel being intermittently rotated by the actuation of an oscillatory element 72 having an arcuate head 73 carrying a pair of pawls 74 one of which is always engageable with a tooth of the ratchet wheel 71 in whatever position said ratchet wheel may stop after each actuation thereof. This oscillatory element 72, like the hereinbefore described element 52, is provided with a longitudinal slot 75 in its portion at the side of the axis of the element remote from the arcuate head 73 and in this slot a block 76 is slidably mounted and adjusted lengthwise of the slot by a swiveled screw 77 provided at its outer end with a hand wheel 78 for manipulation thereof. The adjustable block 76 is provided with a lateral stud 79 at one side thereof to which one end portion of a pitman bar 80 is pivotally attached, the opposite end portion of said bar being pivotally attached, as at 81, to a crank disk 82 which is fixed on a jackshaft 82 extending transversely of the machine and journaled adjacent its opposite ends in supporting bearings 84 provided on the undersides of the upper longitudinal body frame members 1, by which provision the member 72 is oscillated upon rotation of the crank disk 82 and an intermittent partial rotation is accordingly imparted to the ratchet wheel 71, thereby intermittently actuating the two geared feeder rollers 64 as hereinabove described. It is here noted that this actuation of the feeder rollers 64 is in timed relation to the actuation of the correlated other parts of the machine. As shown more clearly in Figure 3, the jackshaft 83 is driven by and at the same speed with the main drive shaft 25 by the provision of a spur gear 25' on said drive shaft in mesh with a like gear 83' of the same size fixed on the jackshaft.

In the illustrative embodiment of the invention a detachable die nozzle unit is mounted on the underside of the hopper-supporting shelf extension 68 of the upright brackets or standards 69, said unit comprising a body board 85 which covers the outlet opening 67 of the shelf 68 and is provided with an alined series of openings 86 through which the material fed downwardly from the hopper into the flared throat 66 is discharged into die nozzles 87 surrounding said openings 86 and depending from the underside of the board 85. The openings 86 of the board 85 and the passages of the nozzles 87 may be of any desired transverse form according to the shape of the product to be made on the machine. In the illustrative machine the openings 86 of the board 85 are circular and the passages of the nozzles 87 are also circular transversely but they are tapered downwardly to provide some restriction at the outlet ends thereof so that the material as it is exuded from the nozzles is compressed to some degree.

The lower ends of the nozzles 87 terminate some distance above the endless belt 8 in the normal lowered position of the table frame 5, which latter, in the operation of the machine, as hereinbefore described, is at a certain time elevated to a position where the top flight of the endless belt 8 is in close proximity to the lower ends of the nozzles, usually about one-quarter inch below them, this positioning of the top flight of the belt occurring just prior to the starting of rotation of the feeder rollers 64; and, as the material is fed through the nozzles during the rotation of the feeder rollers 64, the table frame 5 is gradually and slowly lowered simultaneously with and preferably at approximately the same speed of exudation of the material from the nozzles until a predetermined amount of material is discharged and supported on the belt, whereupon the table frame continues to move downwardly but more rapidly back to normal lowered position and carries the belt approximately one-half inch away from the exuded material, leaving the latter suspended from the nozzles.

Immediately after the table frame 5 has moved downwardly to its normal lowermost position a knife element is moved across the lower ends of the die nozzles, thereby severing the suspended exuded material from the nozzles and immediately upon the complete severance of the material the knife element is given a quick downward movement with sudden stoppage, whereby the severed material is jarred loose from the knife element and drops onto the upper flight of the endless belt 8. This knife element, in its particular mounting and means of operation, will now be described. As shown, the knife element comprises a blade 88 which is carried by a frame 89 extending transversely of the machine, said frame including an elongated main body member of rectangular cross section and having right angular opposite end portions 90 to which carriage brackets 91 are attached, said brackets extending some distance beyond the ends of the frame 89 and overhanging a pair of parallel track elements 92 which are hingedly mounted at one end, as at 93, on standards 94 extending upwardly from the longitudinal side members 1 of the upper body frame portion of the machine. Said track elements are of channel section and have their flanges disposed outwardly to provide grooved ways in which ride rollers 95 carried by and projected inwardly from downturned end portions 96 of said carriage brackets 91.

The two track elements 92 are rigidly crossconnected intermediate their ends so as to move as an integral unit when swung upwardly and downwardly from their common pivotal axis 93. For this purpose the track elements 82 are provided on their undersides with lugs 97 to which the end portions of a transverse strut bar or rod 98 are rigidly connected in any suitable manner, the unitary frame thus produced being supported at the end thereof remote from the pivotal axis 93 by means to be now described. A pair of lever arms 99 are fixedly secured at one end on a rockshaft 100 which is journaled at its opposite ends in bearings 101 provided therefor on the longitudinal side members 1 of the upper body frame portion of the machine, said arms 99 having the lower end portions of vertical link members 102 hingedly attached thereto, as at 103, the upper end portions of said links members 102 being respectively pivotally attached to the ends of the track elements 92, as at 104, by which provision and arrangement of parts the track frame structure is oscillated on its pivotal axis 93 when a back and forth partial rotation is imparted to the rockshaft 100.

Fixedly secured to the rockshaft 100 is an actuating and supporting arm 105 having a bearing roller 106 journaled on its outer end portion, said roller 106 riding on the periphery of a cam element 107 fixed on the jackshaft 83 which carries the aforesaid crank disk 82 as a part of the actuating mechanism for the feeder rollers 64. This cam element 107 has a high concentric peripheral portion 108 which supports the track frame in a normal elevated position relative to the die nozzles 87 while the roller 86 is riding on said cam portion 108 during the time the material is being forced through the die nozzles and until the knife element has been actuated as hereinbefore described to sever the exuded material. As shown, the high concentric peripheral portion 108 of the cam 107 extends between diametrically opposite points and the remainder of the periphery recedes gradually from one terminal of the concentric portion 108, as at 109, to an abrupt radial shoulder 110 at the other terminal of said concentric portion 108, by which peripheral formation of said cam element 107 and the cam element rotating counter-clockwise as viewed in Figure 7, the roller 106 drops abruptly against the lowest portion of the cam where the radial shoulder 110 occurs with sudden stoppage in the drop so as to jar loose the severed exuded material from the die nozzle or nozzles as hereinbefore stated, and, thereafter, during continued rotation of the cam element, the roller rides on the gradually rising eccentric peripheral portion 109 of the cam and onto the concentric high portion 108, whereby the track frame is raised and so held until the radial shoulder again passes beyond the roller 106. The proportions of the cam formation and the timing of its operation is, of course, coordinated with the relative operation of the other parts of the mechanism of the machine.

The frame 89 of the knife element is reciprocated on the track frame by mechanism to be now described. A crank disk 111 is fixed on one outer end portion of the jackshaft 83 (see Figures 1, 2, 3 and 8), said disk having one end of a pitman rod 112 pivotally attached thereto adjacent its periphery, as at 113, the opposite end of the pitman rod 112 being pivotally attached, as at 114, to a lateral stud on a block 115 slidably fitted in a slotted head 116 formed on the upper end of an actuator lever 117, said actuator lever being fixedly secured at its lower end on the outer end portion of a rockshaft 118 extending transversely of the machine and journaled at its opposite ends in bearings 119 provided therefor on the longitudinal side members 3 of the lower frame portion of the machine. The block 115 is adjusted and held in its adjusted position in the slotted head portion 116 of the actuator lever 117 by a screw element 120 provided on the head portion 116 and operating in a manner similar to the hereinbefore described screw elements 57 and 77.

A companion pair of lever members 121 are fixedly secured at their lower ends on the rock shaft 118 a slight distance inwardly from the body frame members 3 of the machine, said lever members 121 extending upwardly in parallel relation to each other and to the aforesaid actuator lever 117, said lever members 121 being considerably longer than the lever 117 so as to extend above the plane of the tabel frame 5 and they have the end portions of pitman rods 122 pivotally attached to their upper ends, as at 123, said pitman rods 122 being pivotally attached at their opposite ends respectively to the downwardly extended end portions 96 of the carriage brackets 91, as at 124. By this provision and arrangement, when the crank disk 111 is rotated the actuator lever 117 is oscillated, thereby rocking the shaft 118 and effecting a parallel oscillation of the lever members 121, so that, through the intermediary of the pitman rods 122, the knife element is reciprocated on the track frame, the initial travel of the knife element in one direction causing the severance of the exuded material from the die nozzle or nozzles and the continued movement in the same direction taking the knife into working range of a cleansing medium as will presently more fully appear. To embody the actuator lever 117 and companion pair of lever members 121 in a rigid unitary frame assembly, said elements 117 and 121 are cross-connected by interposed tubular strut members 125 alined with apertures provided for the purpose in said elements 117 and 121, through which a tie rod 126 is extended, one end of said rod being secured by a nut, as at 127, to the actuator lever 117 and its opposite end likewise to the remote lever 121, as at 128 (see Figure 8). However, any other suitable bracing and reinforcing arrangement may be provided in the structure.

The cleansing medium will now be described. As shown, this comprises a hollow casing into which the cutting blade of the knife element is carried and subjected to both the cleansing action of a jet of steam or a suitable heated liquid or other solvent and a blast of air for drying the blade before the knife element is returned to its cooperative working relation to the die nozzle or nozzles. Obviously, inasmuch as the cleansing and drying chamber is necessarily of considerable proportions and must be located above the table frame 5 to provide ample working clearance for the endless conveyor belt 8 carried by said frame, the pair of track elements 92 have their portions adjacent the hinged ends thereof offset to a plane above the portions thereof adjacent their opposite ends which support the knife element in working relation to the die nozzle or nozzles, and, because of the peculiar structural form of the knife element and particularly the overhanging carriage brackets 91 at the ends thereof which carry the rollers 95 that ride in the flanged ways of the track elements 92 as hereinbefore described, the hollow casing of the cleansing and drying medium, designated generally by the reference numeral 129, has its opposite side walls horizontally slotted, as at 130, for the passage of the blade-carrying portion of the knife element frame into the casing with the carriage brackets 91 extended beyond the walls of the casing so that said carriage brackets can ride without interruption throughout the entire length of the track elements 92. In this connection, it is here noted that by reason of the rocking movement of the knife carrier as it passes onto and from the inclined intermediate portions 92' of the track elements 92 between the lower and upper horizontal flights thereof, there is a beneficial tendency to jar from the knife element any loose particles of the exuded material from the die nozzle or nozzles which might be carried by the cutting blade and thus minimizing the amount of adhering material which is to be washed from the blade as it passes into the casing 129.

As shown, the casing 129 of the cleansing and drying medium is mounted adjacent its forward end on standards 131 having rightangular base portions 132 secured on top of the longitudinal side members 1 of the upper body frame portion of the machine (see Figures 1 and 7). These standards 131, which are of ordinary commercial L-section, are welded or otherwise fastened to the upper side wall portions 133 of the casing 129, the upper end portions of the standards 131 being either offset inwardly to meet said side wall portions 133 or a filler block being obviously provided between the side wall portions and the end portions of the standards so that the major portion of the standards below the horizontal slots 130 in the side walls of the casing 129 are spaced an ample distance from the walls to accommodate therebetween the track elements 92 and also to afford clearance for the carriage brackets 91 of the knife element riding on the track elements, or, obviously, to attain the same effect, the standards 131 may extend upwardly without any inward offset and instead of providing a filler block between the upper ends of the standards and the adjacent wall portions of the casing 129, the upper portion of the casing above the wall slots 130 may be made wider than the lower portion of the casing below said slots so that the adjacent wall portions of the casing can be attached directly to the upper end portions of the standards and in that way provide the necessary clearance for the track elements 92 and carriage brackets 91. To further support the casing 129 with more stability, supplemental supporting straps 134 may be extended from the lower rear corner of the casing at an inclination upwardly therefrom and secured at their ends to a transverse bar 135 which is mounted at its opposite ends on the standards 94 on which the track elements 92 are hingedly mounted as hereinbefore described. Obviously, however, the casing 129 may be mounted on the body frame of the machine in any other approved manner.

At the forward end of the casing 129 is an air supply manifold comprising an upper chamber 136 and a lower chamber 137, said chambers being connected by a common conduit 138 leading thereto from a conventional blower 139 (see Figures 1 and 7). The upper chamber 136 of the air supply manifold is provided with a plurality of slanting jet nozzles 136' which are directed downwardly and rearwardly from the bottom of the chamber with their discharge ends terminating in a plane coincident with or slightly above the top edge of the slotted wall portions 130 and the lower chamber 137 is provided with similar jet nozzles 137' directed upwardly and rearwardly from the top of the chamber and, of course, terminating in a plane a distance sufficiently below the slots 130 to afford ample clearance for the knife element, yet sufficiently close to the path of the knife element to effectively discharge air jets against the cutting blade and adjacent supporting frame portions, it being understood that the air conducted to the manifold may be obviously heated by any suitable means (not shown) either before or after the air enters the blower 139.

Located inwardly from the manifold chambers 136 and 137 are upper and lower tubular manifolds 140 and 141, respectively, the upper manifold being provided with a series of nozzles 140' and the lower manifold with a counter series of nozzles 141', said nozzles being directed slantingly similarly to the aforesaid air nozzles 136' and 137' so as to discharge upon the cutting blade and adjacent frame parts of the knife element passing therebetween, jets of steam, heated water or any other suitable fluid solvent which may be obviously supplied to the manifolds 140 and 141 by any practical means (not shown). The drainage of the entire casing 129 may be from the lower portion thereof through a suitable outlet 142 (see Figure 1) located close to the bottom 143 and adjacent the rear end wall of the casing, said bottom 143 inclining downwardly toward the outlet 142. Obviously, in the installation of the machine, the outlet 142 of the casing 129 may have a conducting pipe (not shown) leading therefrom to a remote place of sewage.

By the provision of a cleansing and drying medium as illustrated and just above described, the cutting blade of the knife element is cleansed and dried or at least the excess moisture is driven from the washed blade immediately after each operation of the knife element and before it is returned to normal position. That is to say, the knife element, after its initial travel during which the exuded material from the nozzle or nozzles 87 is severed as hereinbefore described, continues in its travel on the track elements 92, carrying the cutting blade 88 and the adjacent body portions of the frame 89 on which the blade is directly mounted into the casing 129. As the parts move into the casing they are first subjected to the action of air jets from the nozzles 136' and 137' of the air supply manifold and then to the action of the jets of cleansing fluid from the nozzles 140' and 141' of the fluid supply manifolds 140 and 141, respectively, the initial effect of the air blast from the nozzles 136' and 137' being to blow any loose particles of material from the subjected parts of the knife element, and after the washing of the parts by the jets of cleansing fluid from the nozzles 140' and 141', the parts are again subjected to the action of the air blast just prior to and during the movement of the knife element out of the casing 129, so that it is returned to its normal position in a cleansed and at least partially dried if not completely dried condition.

It is, of course, understood that the material of which the product is made on the machine is of a semifluid or soft plastic consistency of the character regularly used in the manufacture of confections such as marshmallows and soft candies or centers to be coated and also other products such as certain kinds of cakes or cookies and the like, which material is sufficiently flowable to be exuded from the die nozzles 87 by the feeding pressure such as that due to the action of the feeder rollers 64, yet the consistency of the material is such that the exuded measured portion thereof will remain in the form in which it is discharged from the die nozzles and the material left in the die nozzles after the severance of the exuded and formed pieces will remain in the die nozzles until the knife element is returned to its normal position and the feeder rollers 64 again actuated to force another predetermined measured amount of material from the nozzles and this occurring intermittently throughout the continued operation of the machine.

While the knife element may be of any desired construction and arrangement it is preferable to construct the same as illustrated in the accompanying drawings, wherein, as hereinbefore described, said element comprises the body frame member 89 having the rightangular end portions 90, the cutting blade 88 being attached at its opposite ends to the adjacent ends of the rightangular end portions 90 of the body frame as at 144 and shown more clearly in Figure 14 of the drawings. The cutting blade 88 is also attached, as at 145, at intervals throughout its length to the ends of supporting arms 146 extending from separate bracket members 147 which are screwed or otherwise secured to the body member 89 of the carrier frame of the knife element, as at 148. Preferably, there is provided one of the arms 146 for each space between the respective die nozzles 87, said arms being of a thickness approximately the same as the width of the respective spaces between the several nozzles (see Figure 12), the cutting blade 88 in the normal raised position of the track elements 92 being in a horizontal plane so that it will move across in freely slidable but close relation to the lower ends of the nozzles during the travel of the blade in its cutting operation and also during its return to normal position. At the same time there is ample space between the bracket arms 146 to permit free exudation of the material from the die nozzle or nozzles 87 and the dropping of the severed pieces onto the conveyor belt 8.

It is here noted that the die nozzles 87 may be made in many different shapes other than the circular form illustrated in the drawings as well as in different sizes, and, also, instead of employing a plurality of the nozzles, a single nozzle may be provided in some machines, depending upon the size and desired capacity of the machine. So, too, for the purposes of interchangeability, separate body boards 85 may be provided in separate units with die nozzles of different sizes and differently formed according to the size and shape of the product to be made on the machine, and, to this end, the respective body boards 85 may be each formed with a rabbeted edge portion 149 to fit in a groove 149' provided by a correspondingly rabbeted edge portion of a cleat or retaining strip 150 secured on the underside of the shelf extension 68 of the standards 69 which supports the hopper 63 (see Figure 11) and providing the body board 85 with open-ended slots 151 and its marginal portion opposite to that which is rabbeted as just above described. With the body board 85 thus provided and its rabbeted edge portion 149 fitted in the groove 149' provided between the supporting shelf 68 and the cleat or retaining strip 150, the body board is detachably fastened in place by a nut 152 provided on a screw-threaded stud 153 or a plurality thereof depending from the underside of the shelf 68 and extending through the slot or slots 151 of the board, the nut or nuts 152 being tightened against the adjacent under face portion or portions of the board after the board is set in place.

In order to automatically dust the top flight of the endless conveyor belt 8 with a suitable powdered material or flour such as powdered sugar, starch or other suitable material commonly used in the manufacture of confections and products such as the machine of the present invention is designed to produce, a supply hopper 154 is preferably mounted, as at 155, on the longitudinal side members 5 of the table frame adjacent the ends thereof, remote from the pivotally mounted discharge end of the table which the upper flight of the belt constitutes, said hopper extending transversely above the conveyor belt and having an elongated but otherwise restricted opening through which a small quantity of the dusting material is dropped onto the belt throughout substantially the entire width thereof. No further details of the hopper 154 are illustrated inasmuch as the form of the hopper and the provision at the bottom thereof for feeding the contained material therefrom onto the upper flight of the belt 8 which travels thereunder may be of any suitable construction and arrangement. Therefore, suffice it to say that the material is readily shaken through a restricted outlet opening in the bottom of the hopper and onto the belt 8 upon each up and down oscillation of the table frame 5 which supports the hopper and oscillation of the frame occurring intermittently during the operation of the machine as hereinbefore described.

To maintain the conveyor belt 8 in a sanitary condition for its use throughout the continued operation of the machine, a scraper element 156 is provided adjacent the discharge end of the machine, said element comprising a conventional blade extending transversely of the upper portion of the body frame of the machine between the longitudinal side members 1 of the frame with its top edge portion located in a plane where the lower flight of the belt 8 traveling between the belt-supporting rollers 12 and 13 rides on the blade with sufficient frictional contact whereby the powdered material which has been used on the upper flight of the belt is scraped therefrom and a fresh supply of the material from the hopper 154 is deposited on the belt as the upper flight thereof passes under said hopper 154 as just above described. To further keep the upper flight of the conveyor belt 8 free of deleterious foreign particles the track frame 92 is provided on its underside with a catch plate or pan 92″ in the region of the inclined portion 92′ of the frame between the upper and lower flights of the two trackways thereof, said plate or pan 92″ being formed correspondingly to the contour of the undersides of the track elements and secured in any suitable manner at its opposite side marginal portions to said track elements, the forward end of said plate or pan 92″ terminating just short of the knife element when the latter is in its normal position and the rear end of the plate or pan terminating a short distance within the forward end portion of the casing 129 of the cleansing means, so that an effective shield is provided to prevent loose material dropping onto the conveyor belt 8 from the knife element as it travels after its material-severing operation toward and into the casing 129, the shield thus provided also preventing drippings from the washed knife element parts falling onto the belt while the knife element is returning to its normal position from the casing 129.

It is here also noted that a shelf 157 is provided contiguous to and in substantially the same plane as the discharge end of the upper flight of the conveyor belt 8 (see Figure 1b). From this shelf 157 the formed pieces produced in the operation of the machine and delivered to the shelf by the traveling upper flight of the conveyor belt 8 may be taken off by an attendant or the pieces may be onviously delivered therefrom onto a conventional conveyor or onto a removable and portable board or tray located adjacent the shelf.

The main driving shaft 25 of the machine may be driven from any suitable source of power. However, as shown in Figure 1 of the drawings, a conventional power unit 158 is mounted on the lower body frame portion of the machine, said unit being preferably of the type commercially known as the "Reeves variable speed drive" which includes therein an electric motor the power shaft of which is geared to a power take-off shaft 159 having a sprocket wheel 160 fixed thereon and connected by an endless chain 161 to a sprocket wheel 162 (see Figure 3) fixed on the driving shaft 25 of the machine adjacent the spur gear 25′ on said shaft, which gear, in turn, drives the spur gear 83′ on the jackshaft 83 as hereinbefore described. In this connection, it is also noted that the rotor of the blower 139 may be driven from the main driving shaft 25 of the machine by any obvious belted or geared connection therewith (not shown).

From the foregoing description of the machine its operation as a whole is obvious, inasmuch as the details of the construction and arrangement of the different and separate yet correlated mechanisms thereof have been described definitely as well as the relative timing of their respective operations. However, it may be here pointed out that not only are the separate mechanisms of the machine readily adjustable for exact nicety in the general operation of the machine and for adapting the machine to manufacture pieces of different shapes as well as sizes, but the machine is also automatically maintained in a sanitary condition. So, too, by the particular method of feeding the constituent material from the supply hopper and forming the material as it is exuded from the die nozzles the desirable moisture is retained and a fluffier and better product is produced than is possible with the methods heretofore employed and particularly in the molding or casting process, the hereinbefore described disadvantages of which prior method or methods are overcome by the use of the machine of the present invention and process of manufacture which is carried out thereon in a highly efficient and practical manner. There is a further important advantage in the use of the machine of the present invention in that the machine may be installed and operated in a room which is air-conditioned for refrigeration, humidification or dehumidification, as may be desirable or necessary, because of the length of travel of the conveyor belt on which the carried products become surface hardened or encrusted to the desired degree, thereby obviating the necessity for taking the products to special rooms or chambers for such treatment as is necessary with machines heretofore generally used.

While the machine illustrated in the drawings and herein described embodies a practical adaptation of the present invention, it is obvious that considerable modification and alteration may be made therein without departing from the spirit and scope of the invention as defined in the appended claims. The invention, therefore, is not limited to the specific construction and arrangement shown.

What is claimed is:

1. In a machine for making confectionery and other food products of constituent materials of similar original plastic consistencies, a supply container for the constituent material, said container having feeder means for intermittently expressing a predetermined quantity of the material through and from a definitely restricted outlet orifice at the bottom of the container, a conveyor traveling intermittently and normally at a substantial distance beneath said container outlet orifice, timed actuating means for raising and lowering the conveyor during each period of rest in its intermittent travel, whereby the conveyor, just prior to each feeding actuation of the feeder means, is placed in an initial uppermost effective material-receiving position closely adjacent the container outlet orifice, then moves downwardly simultaneously with and at substantially the speed of exudation of the body of material from the outlet orifice at the start of and during the full feeding actuation of the feeder means so as to support the under part of the body of exuded material and maintain the entire body in the form, both longitudinally and transversely, as created only by the expressed passage of the material through the outlet orifice, and after termination of material exudation moves further downward at increased speed away from the body of exuded material and is brought to rest in a position definitely spaced thereunder, whereby the body is left suspended from the outlet orifice, and means operating intermittently for severing the suspended body of exuded material at the outlet orifice.

2. In a machine of the character described and including in combination with a reciprocatory knife element for severing exuded constituent material from a superposed supply container, of a track frame comprising a pair of opposed track members on which the knife element is supported with means for effecting its reciprocation, said track members having parallel lower horizontal flights extending below and at opposite sides of the supply container and parallel upper horizontal flights offset from and connected to said lower flights by inclined intermediate portions, the upper flights of said track members being pivotally supported at their ends remote from the intermediate inclined portions, an actuating support for the ends of the lower flights of said track members remote from said intermediate inclined portions, said actuating support being operated intermittently to swing the track frame downwardly with limited movement and sudden stoppage whereby to jar the severed material loose from the knife element while the latter is yet on the lower track members of the frame after completion of its material-severing movement, the knife element continuing its movement in the same direction along the lower flights of the track members after the jarring operation and onto the upper flights thereof and then returning to normal position upon each actuation of its reciprocating means, and a chambered cleansing device located within the track frame for the reception of the knife element, said device having cleansing and drying media therein to the action of which the knife element is subjected as it is moved into and out of the device in its reciprocatory travel on the upper flights of the track members of the track frame.

3. The method of manufacturing confections, consisting in expressing the plastic material from the lower end of a container, supporting the lower end of the expressed material on a vertically movable support during the entire expressing operation, severing the upper end of the expressed material while the lower end is supported, and moving the severed material vertically downwardly away from the material from which it was severed.

4. In a machine of the kind described, comprising a container, means for expressing plastic material from the lower end of the container, an intermittently driven conveyor vertically movable and adapted to support the expressed material during the entire expressing operation, and a cutter element operating close to the container for severing the expressed material while the lower end thereof is supported by the conveyor, and means for further lowering the conveyor for separating the severed plastic material.

5. In a machine of the kind described, comprising a container, means for expressing plastic material from the lower end of the container, an intermittently driven conveyor having a vertical slow downward movement and adapted to support the expressed material during the entire expressing operation, a cutter element operating close to the container for severing the expressed material while the lower end thereof is supported by the conveyor, and means for further lowering the conveyor and simultaneously moving the cutter downwardly.

6. A machine of the kind described, comprising a container, means for expressing plastic material from the lower end of the container, an intermittently driven conveyor having a vertical slow downward movement and adapted to support the expressed material during the entire expressing operation, a cutter element operating close to the container for severing the expressed material while the lower end thereof is supported by the conveyor, and means for imparting a rapid downward movement of the cutter to separate the expressed material from the cutter.

7. In a machine of the kind described, comprising a container, means for expressing plastic material from the lower end of the container, a horizontally arranged intermittently driven conveyor below the container, means for imparting a slow downward movement to the conveyor, a cutter element operating close to the container for severing the expressed material while the lower end thereof is supported by the conveyor, means for further lowering the conveyor, and means for lowering the cutter and causing a short stoppage thereof to cause a separation of the expressed material from the cutter.

8. In a machine of the kind described, comprising a container, means for expressing plastic material from the lower end of the container, a horizontally arranged conveyor below the container and intermittently driven, means for imparting a vertical slow downward movement to the conveyor, a pivoted horizontally movable cutter element operating close to the container for severing the expressed material while the lower end thereof is supported by the conveyor, means for further lowering the conveyor, and means for swinging the cutter downwardly on its pivot to cause a short stoppage thereof to cause a separation of the expressed material from the cutter.

EDWARD H. EDWARDS.